(12) United States Patent
Pydin (10) Patent No.: US 10,598,269 B2
(45) Date of Patent: Mar. 24, 2020

(54) AERATION PREVENTING APPARATUS

(71) Applicant: Honda Motor Co., Ltd., Tokyo (JP)

(72) Inventor: Andrii Pydin, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 16/101,216

(22) Filed: Aug. 10, 2018

(65) Prior Publication Data

US 2019/0063587 A1 Feb. 28, 2019

(30) Foreign Application Priority Data

Aug. 29, 2017 (JP) .................. 2017-164384

(51) Int. Cl.
| | |
|---|---|
| *F16H 57/04* | (2010.01) |
| *F04C 2/08* | (2006.01) |
| *B60K 1/00* | (2006.01) |
| *B60K 17/16* | (2006.01) |

(52) U.S. Cl.
CPC .......... *F16H 57/0409* (2013.01); *B60K 1/00* (2013.01); *B60K 17/165* (2013.01); *F04C 2/084* (2013.01); *F16H 57/043* (2013.01); *F16H 57/045* (2013.01); *F16H 57/0424* (2013.01); *F16H 57/0441* (2013.01); *F16H 57/0442* (2013.01); *F16H 57/0456* (2013.01); *F16H 57/0476* (2013.01); *F16H 57/0486* (2013.01); *F16H 57/0495* (2013.01); *B60K 2001/001* (2013.01); *B60Y 2306/03* (2013.01); *B60Y 2410/10* (2013.01)

(58) Field of Classification Search
None
See application file for complete search history.

(56) References Cited

U.S. PATENT DOCUMENTS

| | | | |
|---|---|---|---|
| 7,189,178 B2* | 3/2007 | Weith .................. | F16H 57/0483 184/6.12 |
| 7,587,955 B2* | 9/2009 | Vierheilig .......... | F16H 57/0497 74/424.81 |
| 9,732,841 B2* | 8/2017 | Valente ............... | F16H 57/0447 |
| 2019/0063590 A1* | 2/2019 | Pydin .................. | F16H 57/0486 |

FOREIGN PATENT DOCUMENTS

JP 2007205499 A 8/2007

* cited by examiner

*Primary Examiner* — Dirk Wright
(74) *Attorney, Agent, or Firm* — Duft & Bornsen, PC (57) ABSTRACT

An aeration preventing apparatus including a partition erected on an upper surface of a bottom wall portion of a case member to separate a reservoir space of oil into a radially inward space and a radially outward space and provided with openings formed over a whole circumference in the partition so as to communicate the radially inward space and the radially outward space, an oil passage forming part forming an oil passage from a suction port facing the radially inward space to an oil pump, a movable plate formed in a substantially arc shape and disposed facing a peripheral surface of the partition so as to cover a part of the openings, and a plate support supporting the movable plate to be movable along the peripheral surface of the partition by a gravitational or inertial force acting on the movable plate.

7 Claims, 11 Drawing Sheets

AERATION PREVENTING APPARATUS

CROSS-REFERENCE TO RELATED APPLICATION

This application is based upon and claims the benefit of priority from Japanese Patent Application No. 2017-164384 filed on Aug. 29, 2017, the content of which is incorporated herein by reference.

BACKGROUND OF THE INVENTION

Field of the Invention

This invention relates to an aeration preventing apparatus for preventing suction of air by an oil pump installed in a vehicle.

Description of the Related Art

Conventionally, there is a known apparatus for preventing occurrence of aeration when a pump sucks in oil accumulated at the bottom of a transmission. In the apparatuses of this type described in Japanese Unexamined Patent Publication No. 2007-205499 (JP2007-205499A), a strainer centered on a vertical axis is installed to be rotatable fully around the inside of an oil pan. Therefore, when a force arising during vehicle acceleration, turning or the like shifts the oil level in the oil pan, the strainer rotates in the direction of the shift to prevent suction of air through an oil intake port at the end of the strainer.

However, since the apparatus taught by JP2007-205499A requires a space for rotating the strainer at the bottom of the transmission, it increases height of the transmission by the height of this space.

SUMMARY OF THE INVENTION

An aspect of the present invention is an aeration preventing apparatus, including: a case member installed in a vehicle and including a bottom wall portion and a side wall portion to form a reservoir space for accumulating an oil supplied from an oil pump; a partition erected on an upper surface of the bottom wall portion and formed in a substantially cylindrical shape about a axial line in a vertical direction to separate the reservoir space into a radially inward space and a radially outward space, the partition including openings formed over a whole circumference in the partition so as to communicate the radially inward space and the radially outward space; an oil passage forming part configured to form an oil passage from a suction port facing the radially inward space to the oil pump; a movable plate formed in a substantially arc shape about the axial line and disposed facing a peripheral surface of the partition so as to cover a part of the openings; and a plate support configured to support the movable plate to be movable along the peripheral surface of the partition by a gravitational or inertial force acting on the movable plate.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
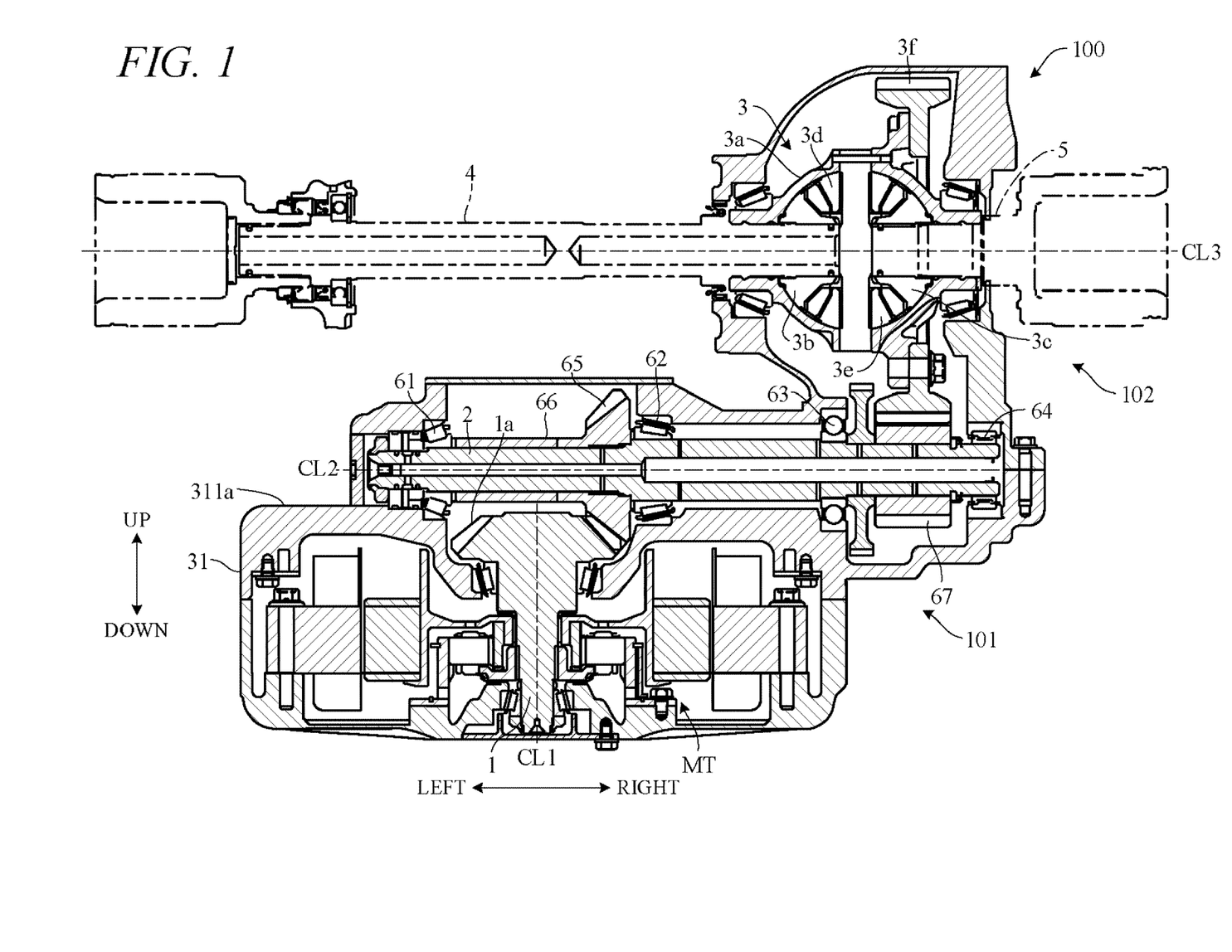
FIG. 1 is a cross-sectional diagram showing a developed view of main components of a vehicle drive apparatus to which an aeration preventing apparatus according to an embodiment of the present invention is applied.

Hereinafter, an embodiment of the present invention is explained with reference to FIGS. 1 to 10B. FIG. 1 is a cross-sectional diagram showing a developed view of main components of a vehicle drive apparatus 100 to which an aeration preventing apparatus according to the embodiment of the present invention is applied. The vehicle drive apparatus 100 includes an electric motor MT as an example of a dynamoelectric machine and is configured to output torque from the electric motor MT to driving wheels of a vehicle. Therefore, the vehicle drive apparatus 100 is mounted on an electric vehicle, hybrid vehicle or other vehicle having the electric motor MT as a drive (propulsion) power source. The electric motor MT is also used as a generator. In FIG. 1, under a condition that the vehicle drive apparatus 100 is mounted on the vehicle, vehicle vertical (height) direction, i.e., up-down direction and lateral (width) direction, i.e., left-right direction are indicated by arrows.

As shown in FIG. 1, the vehicle drive apparatus (vehicle drive unit) 100 includes a first drive unit 101 for converting and outputting torque of the motor MT as torque centered on a lateral axis CL2 and a second drive unit 102 for converting and outputting torque output from the first drive unit 101 as torque centered on a lateral axis CL3. Although the second drive unit 102 appears above the first drive unit 101 in the developed view of FIG. 1, the second drive unit 102 is actually situated forward or rearward of the first drive unit 101, and axis CL3 is located below axis CL2 (see FIGS. 4A and 4B).

As shown in FIG. 1, the vehicle drive apparatus includes the motor MT, a first shaft 1 rotatably supported centered on a vertical axis CL1 extending in up-down direction inside the motor MT, a second shaft 2 rotatably supported centered on the axis CL2 orthogonal to the axis CL1, and a differential 3 rotatably supported centered on the axis CL3 parallel to the axis CL2. Torque from the motor MT is transmitted through the first shaft 1, second shaft 2 and differential 3 to left and right drive shafts 4 and 5, whereby left and right drive wheels are driven.

Figure 2:
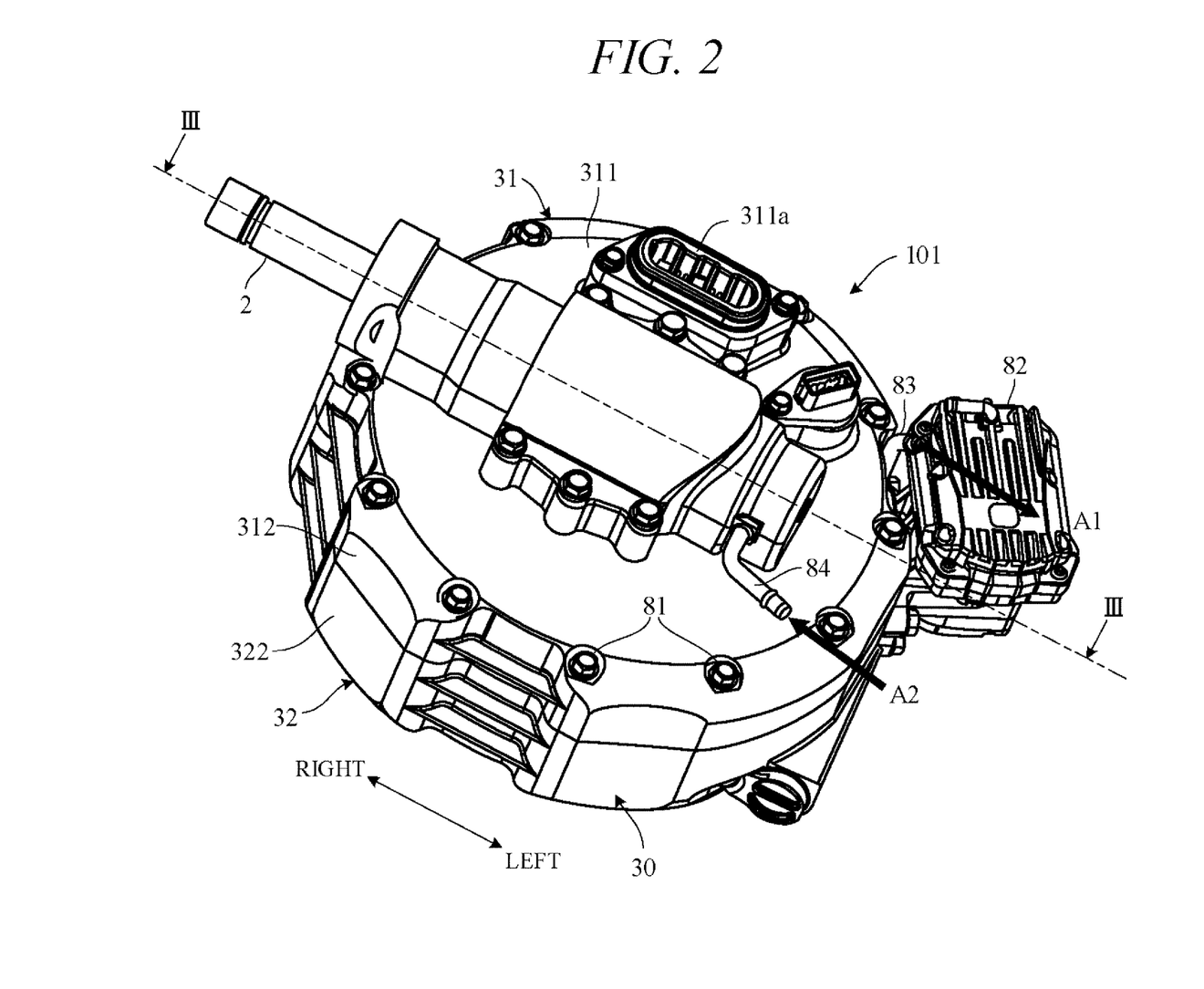
FIG. 2 is a perspective view showing an appearance of main parts of the vehicle drive apparatus of FIG. 1.
Figure 3:
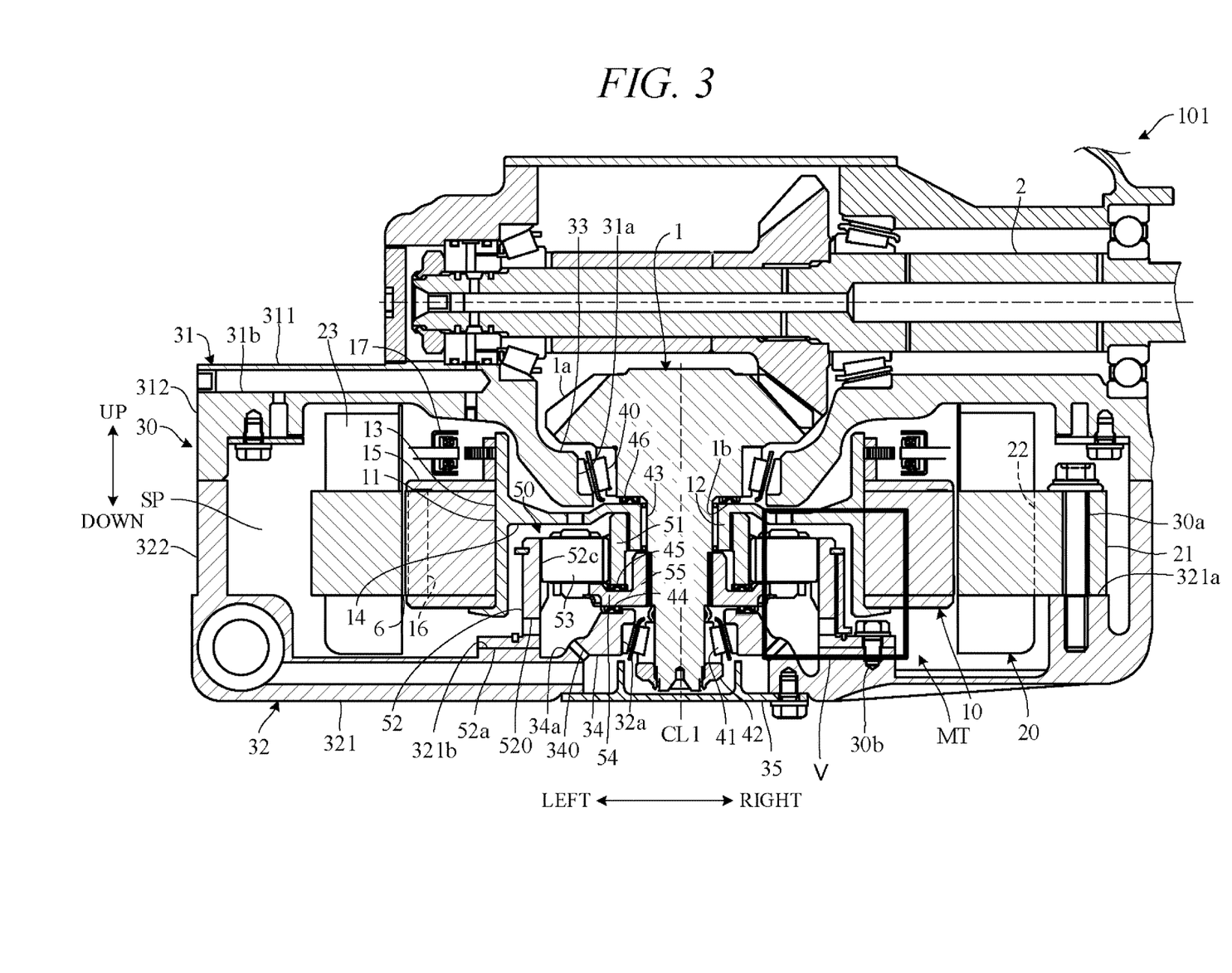
FIG. 3 is a cross-sectional diagram taken along line of FIG. 2.

FIG. 2 is a perspective view showing an appearance of the first drive unit 101 of FIG. 1 as viewed obliquely from above. FIG. 3 is an enlarged cross-sectional diagram of main parts of the first drive unit 101 of FIG. 1 (cross-sectional diagram taken along line of FIG. 2), and is the cross-sectional diagram of a position (portion) different from that of FIG. 1.

As shown in FIG. 3, the motor MT includes a rotor 10 which rotates centered on the axis CL1 and a stator 20 arranged around the rotor 10. The rotor 10 and stator 20 are accommodated in a housing space SP inside a case 30.

The rotor 10 includes a rotor hub 11 and a rotor core 15. The rotor hub 11 includes a substantially cylinder-shaped shaft portion 12 centered on the axis CL1, a cylindrical portion 13 of larger diameter than and coaxial with the shaft portion 12, and a substantially disk-shaped plate portion 14 which extends radially to connect the shaft portion 12 and cylindrical portion 13. The rotor core 15 is a substantially cylinder-shaped rotor iron core centered on the axis CL1. The rotor core 15 is fitted on and fastened to an outer peripheral surface of the cylindrical portion 13 of the rotor hub 11 so as to rotate integrally with the rotor hub 11. The motor MT is an interior permanent magnet synchronous motor, and multiple circumferentially spaced permanent magnets 16 are embedded in the rotor core 15. A sensor 17 for detecting a rotational position (rotational angle) of the rotor 10 is provided above the rotor core 15. Alternatively, it is possible instead to use as the motor MT one having no magnets 16, such as a synchronous reluctance motor or switched reluctance motor.

The stator 20 has a substantially cylinder-shaped stator core 21 which is centered on the axis CL1 and disposed across a gap 6 of predetermined radial length from an outer peripheral surface of the rotor core 15. The stator core 21 is a fixed iron core whose inner peripheral surface is formed with multiple circumferentially spaced radially outward directed slots 22. A winding 23 (coil) is formed in the slots 22 as a concentrated winding or distributed winding. Upper and lower ends of the winding 23 protrude upward and downward of upper and lower ends of the stator core 21. The rotor 10 rotates when a revolving magnetic field is generated by passing three-phase alternating current through the winding 23.

As shown in FIGS. 2 and 3, the case 30 includes an upper case 31 and a lower case 32 which are vertically separable. The upper case 31 has a substantially circular top wall 311 and a substantially cylindrical side wall 312 extending downward from a peripheral portion of the top wall 311. A connector 311a is provided on an upper surface of the top wall 311, and electric current is supplied through the connector 311a to the winding 23 below the top wall 311. The lower case 32 has a substantially circular bottom wall 321 and a substantially cylindrical side wall 322 extending upward from a peripheral portion of the bottom wall 321. As shown in FIG. 2, the upper case 31 and lower case 32 are joined by multiple peripheral bolts 81 passing downward through the upper case 31 and screwed into the lower case 32.

As shown in FIG. 3, flanges 321a are provided on an upper surface of the bottom wall 321, and the stator core 21 is fastened to the flanges 321a by through-bolts 30a. Substantially circular openings 31a and 32a centered on the axis CL1 are formed at a middle region of the upper case 31 and a middle region of the lower case 32, respectively. A shaft support 33 formed in a substantially truncated cone shape is provided in the opening 31a of the upper case 31 to extend downward and radially inward. A shaft support 34 formed in a substantially truncated cone shape is provided in the opening 32a of the lower case 32 to extend upward and radially inward.

Outer peripheral surfaces of the first shaft 1 are respectively rotatably supported by the shaft supports 33 and 34 via taper roller bearings 40 and 41. The first shaft 1 is restrained in axial direction by a nut 42 fastened to its lower end portion. A plate-like cover 35 is attached to a lower surface of the bottom wall 321 from outside so as to close the opening 32a. The cover 35 is attached to a flange formed like a recess on the lower surface of the bottom wall 321 so that a lower surface of the cover 35 and the lower surface of the bottom wall 321 are located in about the same plane. An inner peripheral surface of the shaft portion 12 of the rotor hub 11 is supported on the outer peripheral surface of the first shaft 1 via a needle bearing 43 in a manner rotatable relative to the first shaft 1.

A planetary gear mechanism 50 is interposed in a torque transmission path between the rotor 10 and the first shaft 1. The planetary gear mechanism 50 includes a sun gear 51 and a ring gear 52, both of substantially cylinder shape centered on the axis CL1, multiple circumferentially spaced planetary gears 53 disposed between the sun gear 51 and the ring gear 52, and a substantially cylinder shaped carrier 54 placed below the planetary gears 53 rotatably centered on the axis CL1 to rotatably support the planetary gears 53. A needle bearing 44 is interposed between a top surface of the shaft support 34 and a bottom surface of the carrier 54, whereby the carrier 54 is relatively rotatably supported with respect to the shaft support 34. A needle bearing 45 is interposed between a top surface of the carrier 54 and a bottom surface of the sun gear 51, whereby the sun gear 51 is relatively rotatably supported with respect to the carrier 54.

An inner peripheral surface of the sun gear 51 is spline-fitted on an outer peripheral surface of the shaft portion 12 of the rotor hub 11, whereby rotation of the rotor 10 is transmitted to the sun gear 51. The ring gear 52 includes a horizontally extending flange 52a and a cylindrical side wall 52b rising from a radially inward edge portion of the flange 52a. A gear 52c is formed on an upper end inner peripheral surface of the side wall 52b. On the upper surface of the bottom wall 321 of the lower case 32 radially outward of the shaft support 34, a ring-shaped flange 321b is formed centered on the axis CL1. The flange 52a of the ring gear 52 is fastened to the flange 321b by bolts 30b.

The planetary gears 53 are engaged with the sun gear 51 and the ring gear 52, whereby rotation of the sun gear 51 is transmitted through the planetary gears 53 to the carrier 54. The carrier 54 has a substantially cylinder-shaped shaft portion 55 centered on the axis CL1. The shaft portion 55 is of smaller diameter than the sun gear 51, and an inner peripheral surface of the shaft portion 55 is spline-fitted on the outer peripheral surface of the first shaft 1 below the needle bearing 43 and above the tapered roller bearing 41, whereby rotation of the carrier 54 is transmitted to the first shaft 1.

A bevel gear 1a of larger diameter than the tapered roller bearing 40 is formed on an upper end portion of the first shaft 1 above the tapered roller bearing 40. Alternatively, the bevel gear 1a can be provided as a separate body from the first shaft 1 and integrally joined to the outer peripheral surface of the first shaft 1 by spline-fitting or the like. A step 1b is provided on the outer peripheral surface of the first shaft 1, whereby the outer peripheral surface of the first shaft 1 is formed in stepped shape and diameter of the outer peripheral surface is reduced below the step 1b. A needle bearing 46 is interposed between a top surface of the plate portion 14 of the rotor hub 11 and a bottom surface of the step 1b, whereby the first shaft 1 is relatively rotatably supported with respect to the rotor hub 11.

As shown in FIG. 1, the second shaft 2 is rotatably supported on the upper case 31 by a pair of left and right tapered roller bearings 61 and 62 installed diagonally left-upward and diagonally right-upward of the bevel gear 1a of the first shaft 1 and by a ball bearing 63 and a roller bearing 64 installed rightward of the tapered roller bearing 62. The second shaft 2 is inserted along inner peripheral surfaces of a bevel gear 65 and a spacer 66, both of substantially cylinder-shape centered on the axis CL2, which are installed between the left and right tapered roller bearings 61 and 62. At the time of the insertion, the inner peripheral surface of the bevel gear 65 is spline-fitted on an outer peripheral surface of the second shaft 2, whereby the second shaft 2 rotates integrally with the bevel gear 65. Rotation of the first shaft 1 is therefore transmitted through the bevel gears 1a and 65 to the second shaft 2. A spur gear 67 is spline-fitted on the outer peripheral surface of the second shaft 2 between the ball bearing 63 and roller bearing 64, whereby the spur gear 67 rotates integrally with the second shaft 2.

The differential 3 includes a differential case 3a and multiple gears housed in the differential case 3a, i.e., a pair of left and right side gears 3b and 3c respectively attached to the pair of left and right drive shafts 4 and 5, and a pair of pinion gears 3d and 3e which engage the side gears 3b and 3c. An input gear 3f fixed on the differential case 3a engages the spur gear 67 fixed to the second shaft 2, whereby torque of the second shaft 2 is transmitted through the spur gear 67 and input gear 3f to the differential case 3a. Therefore, the differential case 3a rotates around the axis CL3, and the drive shafts 4 and 5 are driven.

Thus in the present embodiment, the vehicle drive apparatus 100 is configured with the axis of rotation CL1 of the motor MT oriented in vehicle height direction, whereby overall height of the vehicle drive apparatus can be reduced as compared with a vehicle drive apparatus whose axis of rotation CL1 is oriented horizontally. A large diameter motor required for developing high output can therefore be easily installed in a height-restricted space of a vehicle.

Figure 4A:
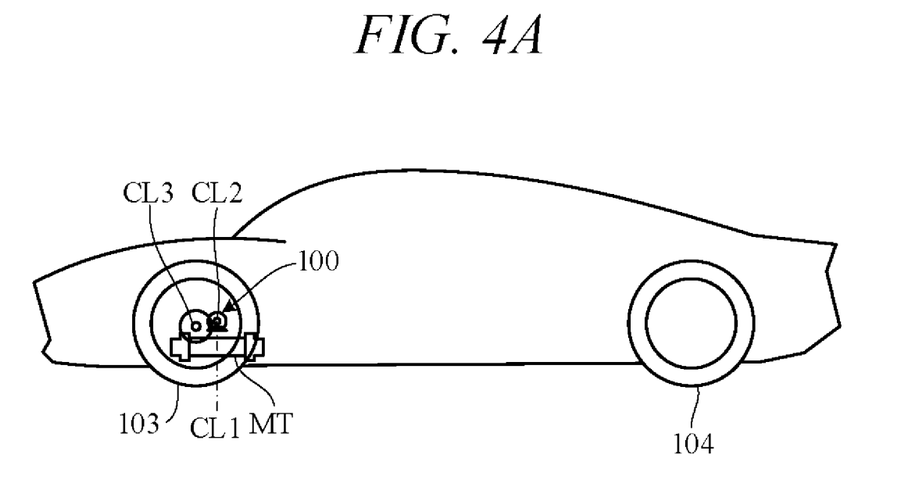
FIG. 4A is a diagram showing a first example of installing the vehicle drive apparatus of FIG. 1 in the vehicle.
Figure 4B:
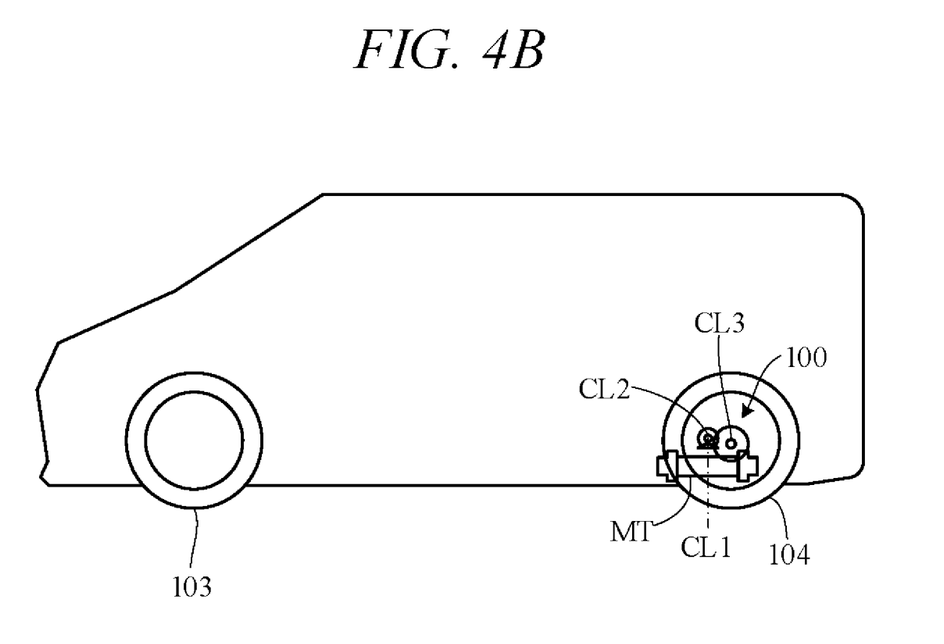
FIG. 4B is a diagram showing a second example of installing the vehicle drive apparatus of FIG. 1 in the vehicle.

FIGS. 4A and 4B are diagrams showing examples of installation of the vehicle drive apparatus 100 in vehicles. FIG. 4A shows an example of installing the vehicle drive apparatus 100 between left and right front wheels 103 for use as a front wheel drive unit. FIG. 4B shows an example of installing the vehicle drive apparatus 100 between left and right rear wheels 104 for use as a rear wheel drive unit. In either example, a top surface of the motor MT is located below the axis of rotation CL3 of the drive wheels 103 or 104. Therefore, when the vehicle drive apparatus 100 is installed in the forward part of the vehicle as shown in FIG. 4A, height of the vehicle hood can be lowered to realize enhanced superiority of design and the like. Further, when the vehicle drive apparatus 100 is installed in the backward part of the vehicle as shown in FIG. 4B, no need arises to raise the floor surface inside the vehicle, so that reduction of vehicle roominess can be avoided.

As shown in FIG. 2, an oil pump 82 is attached to the side wall 322 of the lower case 32. The oil pump 82 is, for example, an electrical trochoidal gear pump. As indicated by arrow A1 in FIG. 2, oil discharged from the oil pump 82 through a pipe 83 is supplied to and cooled by an unshown oil cooler, whereafter, as indicated by arrow A2 in FIG. 2, it is supplied through a pipe 84 to members of the first drive unit 101 as coolant oil or lubricating oil. For example, coolant oil is supplied to an upper end portion of the winding 23 of the motor MT through an oil passage 31b provided in the upper case 31 as shown in FIG. 3.

Oil in the case 30 supplied to various members that accumulates at the bottom of the case 30 is pumped out by the oil pump 82 and circulated. Therefore, when change in vehicle posture or behavior owing to, for example, vehicle turning, acceleration, uphill or downhill driving, or the like, arises that produces a force (e.g., gravitational force or inertial force) that acts on and changes level OL of the oil accumulated at the bottom of the case 30, an immersed oil suction port communicating with the oil pump 82 is apt to emerge from the oil (be exposed), thus causing the oil pump 82 to suck in air, i.e., causing a phenomenon called aeration to occur.

Although aeration can be avoided by, for example, bulging the bottom wall 321 of the case 30 downward to form a reservoir space for constantly holding oil regardless of vehicle turning or other behavior and additionally positioning the suction port to communicate with the reservoir space, such a configuration enlarges the vehicle drive apparatus 100 in height direction. This makes it difficult to install the vehicle drive apparatus 100 in the way illustrated in FIGS. 4A and 4B. The aeration preventing apparatus according to the present embodiment is therefore configured as set out in the following in order to prevent aeration and avoid height enlargement.

Figure 5:
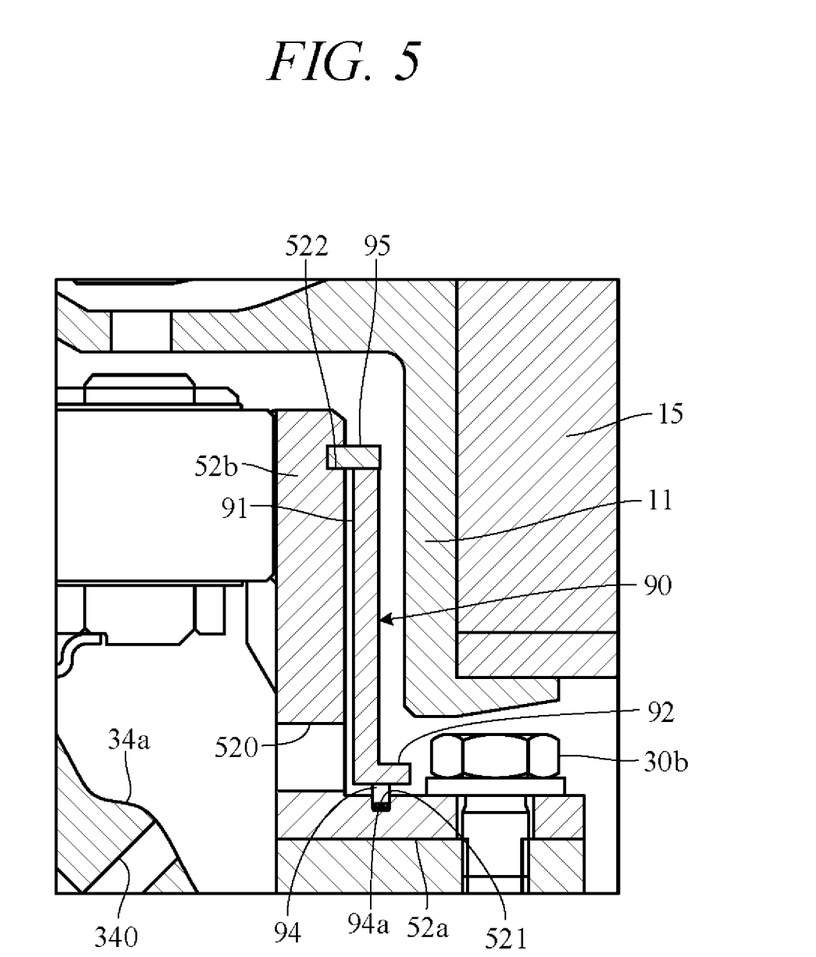
FIG. 5 is a cross-sectional diagram showing main components of the aeration preventing apparatus according to the embodiment of the present invention.
Figure 6:
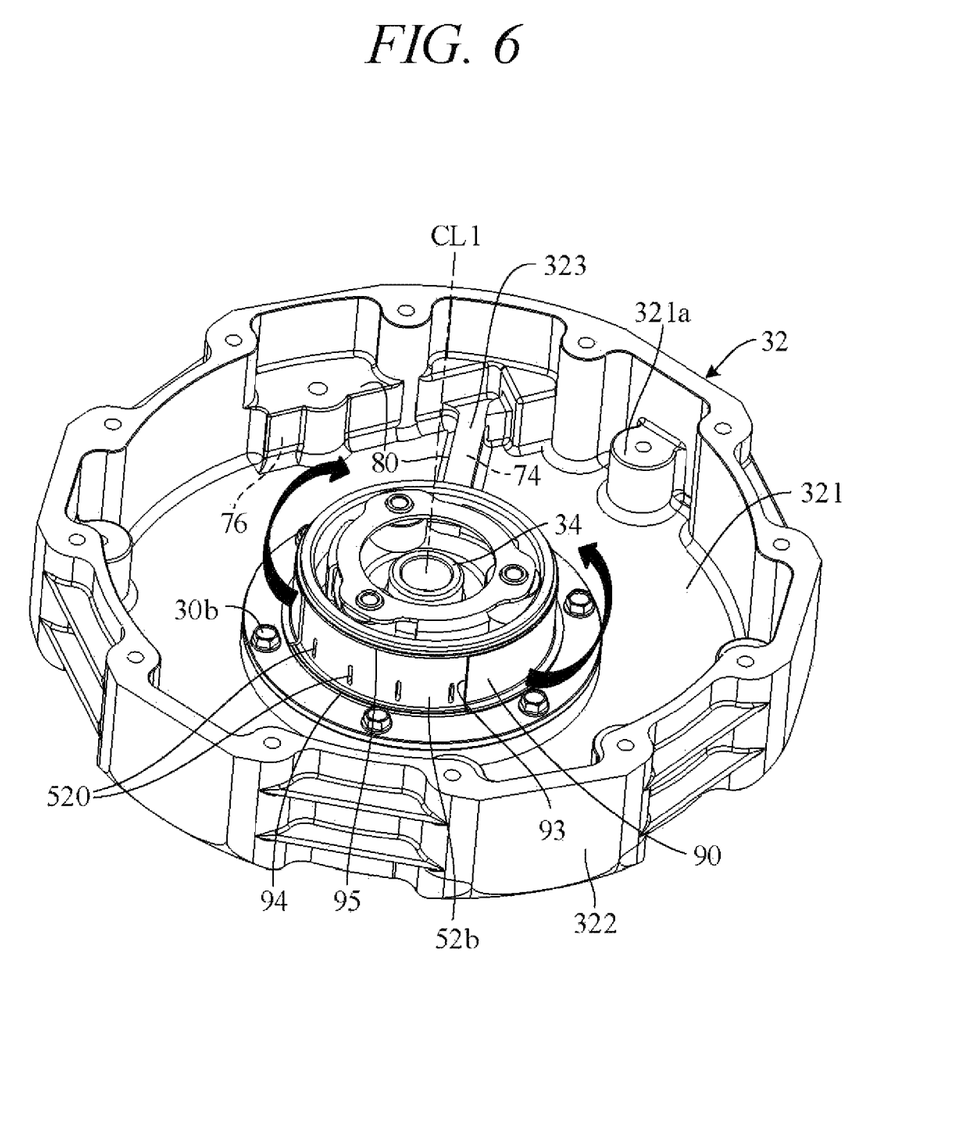
FIG. 6 is a perspective view showing main components of the aeration preventing apparatus according to the embodiment of the present invention.

FIG. 5 and FIG. 6 are a cross-sectional diagram and a perspective view (view from obliquely above) showing main components of the aeration preventing apparatus according to the embodiment of the present invention, respectively. As shown in FIGS. 5 and 6, a lower end portion of the side wall 52b of the ring gear 52 is formed circumferentially with multiple circumferentially equispaced through-holes 520 passing horizontally (radially) through the side wall 52b of the ring gear 52. As shown in FIGS. 3 and 5, the shaft support 34 has a sloped portion 34a inclining radially inward and upward from the bottom wall 321. A lower end portion of the sloped portion 34a is formed circumferentially with multiple circumferentially equispaced through-holes 340 passing obliquely downward from its outer peripheral surface to its inner peripheral surface. The through-holes 340 are positioned lower than the through-holes 520.

Figure 7A:
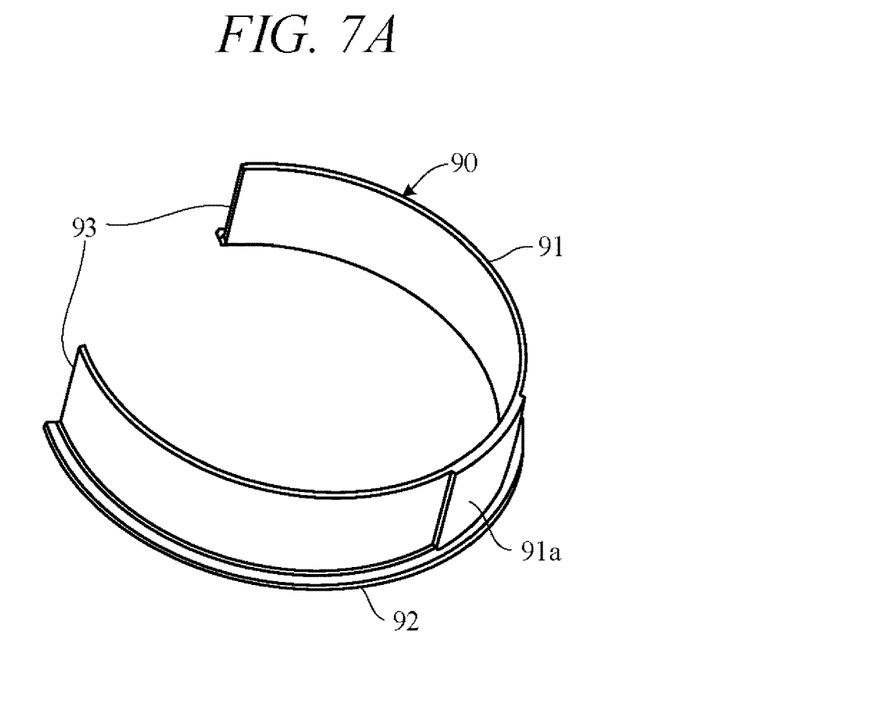
FIG. 7A is a perspective view of a movable plate constituting the aeration preventing apparatus according to the embodiment of the present invention.
Figure 7B:
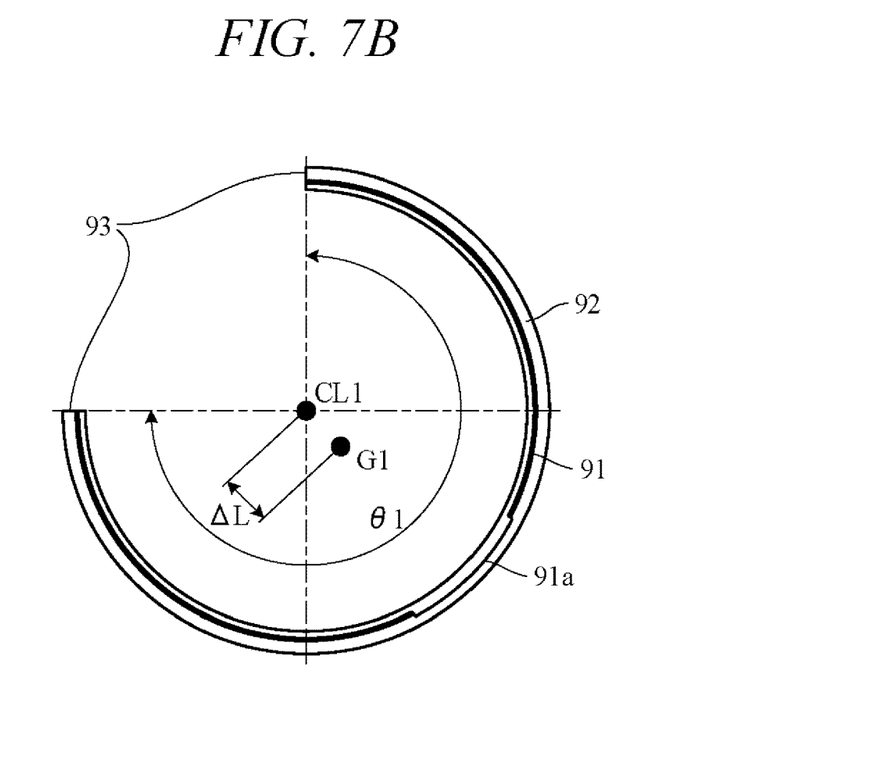
FIG. 7B is a plan view of the movable plate constituting the aeration preventing apparatus according to the embodiment of the present invention.

As shown in FIGS. 5 and 6, a substantially arc-shaped movable plate 90 is installed radially outward of the ring gear 52 to face the outer peripheral surface of the side wall 52b. FIG. 7A is a perspective view and FIG. 7B is a plan view of the movable plate 90. As shown in FIGS. 7A and 7B, the movable plate 90 includes an arc plate 91 of substantially arc-shape centered on axis CL1 and a flange 92 protruding radially outward from a bottom surface of the arc plate 91. Axis CL1-centered angle θ1a between opposite circumferential ends of the arc plate 91 is defined to be greater than 180° (e.g.,)270°). Insofar as at least one through-hole 520 is exposed in an opening 93 between the opposite circumferential ends of the arc plate 91 (four are exposed in the example of FIG. 6), angle θ1 can be greater or smaller than 270°.

An outer peripheral surface of the arc plate 91 is formed at a circumferential center region with a radially outward projecting protrusion (swelling portion) 91a, thereby making the circumferential center region thicker than circumferential end regions on opposite sides thereof. Therefore, as shown in FIG. 7B, center of gravity G1 of the movable plate 90 is shifts away from axis CL1 toward the protrusion 91a by a certain offset ΔL. Provision of the protrusion 91a increases offset ΔL from axis CL1 more than when thickness of the arc plate 91 is circumferentially constant. Rotational moment acting on the movable plate 90 around axis CL1 owing to the movable plate's own weight or inertial force increases with increasing offset ΔL.

As shown in FIGS. 5 and 6, a groove 521 is formed fully around an upper surface of the flange 52a of the ring gear 52 and a ring-shaped mechanical seal 94 is fitted in the groove 521. The mechanical seal 94 has a spring 94a on its bottom. After the mechanical seal 94 is fitted, the movable plate 90 is inserted around the side wall 52b from above the ring gear 52, whereby a bottom surface of the flange 92 comes to abut a top surface of the mechanical seal 94. A groove 522 is formed fully around the outer peripheral surface of the side wall 52b of the ring gear 52. After insertion of the movable plate 90 outward of the side wall 52b, a snap ring 95 is fitted in the groove 522. At this time, a top surface of the movable plate 90 and an undersurface of the snap ring 95 abut and thereby restrain position of the movable plate 90 in axial direction.

In the attached state of the movable plate 90, the mechanical seal 94 is pressed against the biasing force of the spring 94a from above by a certain force. When a rotational moment acts on the movable plate 90 under this condition, the movable plate 90 moves (rotates) around the side wall 52b, as indicated by arrows in FIG. 6, by sliding on the mechanical seal 94, namely, while maintaining seal between the movable plate 90 and the ring gear 52. For example, the movable plate 90 rotationally moves toward vehicle rear by gravitational force during hill-climbing and conversely toward vehicle front during hill descent. Moreover, the movable plate 90 rotationally moves rearward by inertial force during vehicle acceleration and forward during deceleration. In addition, the movable plate 90 rotational moves leftward or rightward by inertial force (centrifugal force) during right turning or left turning.

Figure 8:
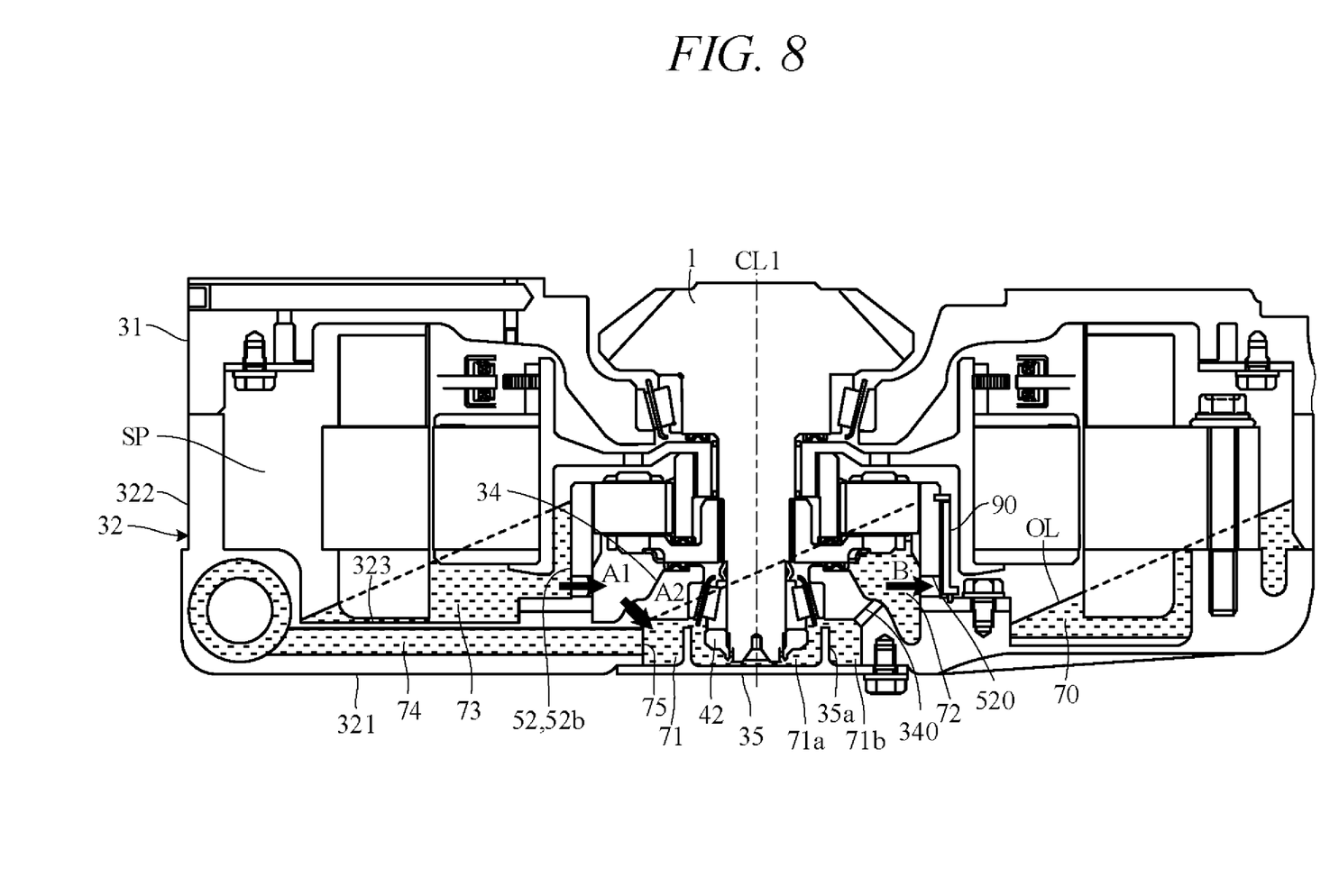
FIG. 8 is a cross-sectional diagram showing a state sifting oil reserved in a case of FIG. 2.

FIG. 8 is a diagram showing positions of oil level OL of oil accumulated in the bottom part of the case 30, in particular, oil level OL in a state after being shifted owing to hill-climbing. As shown in FIG. 8, a reservoir space 70 in which oil supplied from the oil pump 82 accumulates is formed inside (in housing space SP) of the lower case 32 by the bottom wall 321 and the side wall 322. The reservoir space 70 is divided into a substantially circular first reservoir space 71 radially inward of the shaft support 34, a substantially annular second reservoir space 72 between the shaft support 34 and the side wall 52b of the ring gear 52, and a substantially annular third reservoir space 73 radially outward of the side wall 52b.

The first reservoir space 71 and second reservoir space 72 communicate through the through-holes 340, and the second reservoir space 72 and third reservoir space 73 communicate through the through-holes 520. An axis CL1-centered substantially circular plate 35a is erected on an upper surface of the cover 35 attached to the lower surface of the bottom wall 321 of the lower case 32, and the nut 42 on the lower end portion of the first shaft 1 is disposed inward of the plate 35a. The first reservoir space 71 is separated by the plate 35a into a radially inward first reservoir space 71a and a radially outward first reservoir space 71b. The ring gear 52, shaft support 34 and plate 35a function as baffle plates for suppressing flow of oil in the reservoir space 70.

As shown in FIG. 6, an upward projecting protrusion (swelling portion) 323 is provided on the upper surface of the bottom wall 321 to extend radially from the central shaft support 34 to the side wall 322 at the peripheral portion of the bottom wall 321. As shown in FIG. 8, an oil passage 74 is formed inside the protrusion 323. A suction port 75 facing the first reservoir space 71 (radially outward first reservoir space 71b) is provided at one end of the oil passage 74, and the oil passage 74 communicates with the first reservoir space 71 through the suction port 75. As shown in FIG. 6, the other end of the oil passage 74 communicates with the oil pump 82 (FIG. 2) through an oil passage 76 at the lower end portion of the side wall 322. The protrusion 323 and the lower end portion of the side wall 322 constitute an oil passage forming part 80 which forms the oil passages 74 and 76 to extend from the first reservoir space 71 to the oil pump 82.

As indicated by arrows A1 and A2 in FIG. 8, when oil level OL tilts owing to gravitational or inertial force during vehicle running, oil flows through the through-holes 520 from the third reservoir space 73 to the second reservoir space 72 and through the through-holes 340 from the second reservoir space 72 to the first reservoir space 71. At this time, gravitational or inertial force rotates the movable plate 90 in the same direction as the oil flow. As a result, the movable plate 90 closes the through-holes 520 on the side to which oil level OL tilted, so that outflow of oil through the through-holes 520 from the second reservoir space 72 to the third reservoir space 73 as indicated by arrow B is blocked.

Therefore, the first reservoir space 71 constantly retains an amount of oil required for preventing emergence (exposure) of the suction port 75. In particular, even when oil level OL stays tilted for a rather long time, such as during long vehicle hill climbing, the suction port 75 can still be kept immersed in oil. This prevents aeration from occurring in the oil pump 82.

Regarding this point, in a case where relatively short-term shifting (tilting) of oil level OL occurs owing to vehicle turning or the like, oil outflow from the first reservoir space 71 can be inhibited to some extent by the baffle plate function of, inter alia, the shaft support 34 and ring gear 52 (side wall 52b). In a configuration including only baffle plates, however, outflow of oil from the first reservoir space 71 is nevertheless apt to increase and cause aeration when oil level OL stays tilted for a long time owing to hill climbing or the like. On the other hand, provision of the movable plate 90 that can move to cut off communication between second reservoir space 72 and third reservoir space 73 as in the present embodiment ensures reliable prevention of aeration even in cases where the oil level OL remains tilted for a long time.

According to the embodiment, the following operations and effects can be achieved.

(1) The aeration preventing apparatus according to the present embodiment is incorporated in the vehicle drive apparatus 100. Specifically, the aeration preventing apparatus, which is installed in a vehicle, includes the case 30 (lower case 32) and cover 35 which by the bottom wall 321, cover 35 and side wall 322 form the reservoir space 70 for accumulating oil supplied from the oil pump 82; the side wall 52b of the vertical axis CL1-centered substantially cylindrical-shaped ring gear 52 erected on the upper surface of the bottom wall 321 to separate the reservoir space 70 into the first reservoir space 71 and second reservoir space 72 radially inward of the reservoir space 70 and the third reservoir space 73 radially outward of the reservoir space 70; the multiple circumferentially spaced through-holes 520 formed over a whole circumference at the side wall 52*b* to communicate the second reservoir space 72 and third reservoir space 73; the oil passage forming part 80 for forming the oil passages 74 and 76 from the suction port 75 facing the first reservoir space 71 radially inward of the side wall 52*b* to the oil pump 82; the axis CL1-centered substantially arc-shaped movable plate 90 disposed to face the outer peripheral surface of the side wall 52*b* so as to cover a part of the multiple through-holes 520; and the mechanical seal 94 and snap ring 95 for supporting the movable plate 90 to be movable along the outer peripheral surface of the side wall 52*b* by gravitational or inertial force acting on the movable plate 90 (FIGS. 1 to 3, FIG. 5, FIG. 6, FIG. 8).

Owing to this configuration, the movable plate 90 prevents through-hole 520 mediated oil outflow from the first reservoir space 71 and second reservoir space 72 when oil level OL tilts with vehicle running. Therefore, the first reservoir space 71 constantly retains an amount of oil required for preventing emergence (exposure) of the suction port 75 even when, for example, the vehicle drives up a long slope. As a result, occurrence of aeration in the oil pump 82 can be prevented. As a result, aeration can be prevented without enlarging the vehicle drive apparatus 100 in height direction, because no need arises to provide an oil reservoir space by bulging the case 30 downward.

(2) The aeration preventing apparatus according to the present embodiment further includes the first shaft 1 adapted to rotate about axis CL1 above the bottom wall 321 and cover 35, and the planetary gear mechanism 50 arranged around the first shaft 1 and capable of torque transfer with the first shaft 1 (FIG. 3). The side wall 52*b* is constituted by the ring gear 52 of the planetary gear mechanism 50. Therefore, since the ring gear 52 functions as a baffle plate, no need arises to provide a separate baffle plate formed with the through-holes 520 for communicating the reservoir spaces 72 and 73 with each other, so that the apparatus can be simply configured.

(3) The aeration preventing apparatus according to the present embodiment further includes the motor MT accommodated inside the case 30 (FIG. 3). The motor MT includes the rotor 10, which rotates about axis CL1 and is torque transferably connected to the planetary gear mechanism 50, and the stator 20 arranged around the rotor 10. Therefore, since the motor MT is accommodated inside the case 30 to be centered on vertical axis CL1, a motor MT of large diameter suitable for developing high output can be easily installed in a height-restricted space of a vehicle.

(4) In the aeration preventing apparatus according to the present embodiment, the mechanical seal 94 is provided in the support portion of the movable plate 90 to seal a gap between the side wall 52*b* and movable plate 90 (FIG. 5). Since this positively prevents outflow (leaking) of oil through the through-holes 520, aeration can be reliably prevented.

(5) The outer peripheral surface of the movable plate 90 is provided with the protrusion 91*a* so as to make its thickness at the circumferential center region thicker than at the opposite circumferential end regions (FIG. 7B). This increases rotational moment acting on the movable plate 90. Therefore, the movable plate 90 can be easily rotated when oil level OL changes, thereby enabling highly responsive prevention of oil outflow from the second reservoir space 72 through the through-holes 520.

Figure 9A:
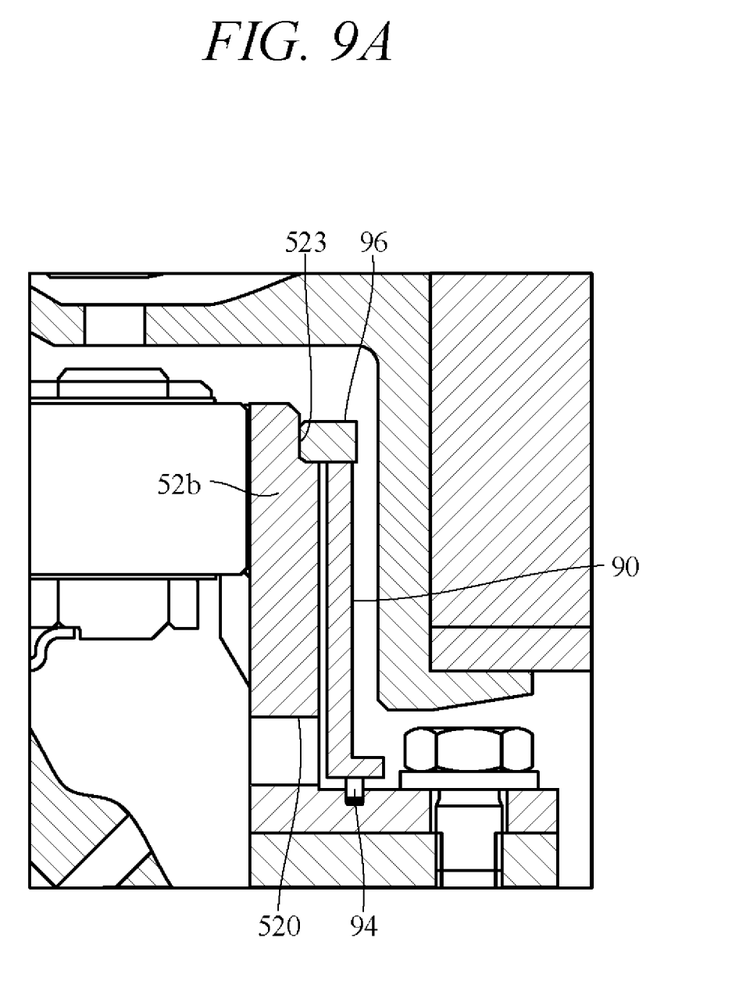
FIG. 9A is a diagram showing a first modification of FIG. 5.

The aeration preventing apparatus according to the present embodiment can be modified as set out below by way of example. FIG. 9A shows a modification of the configuration shown in FIG. 5. FIG. 9A differs from FIG. 5 in a support structure at the top surface of the movable plate 90. More specifically, in the modification shown in FIG. 9A, a threaded portion 523 is formed on an outer peripheral surface of an upper end portion of the side wall 52*b*. A nut 96 centered on axis CL1 (FIG. 8) is screwed onto the threaded portion 523. Therefore, the top surface of the movable plate 90 abuts the nut 96, and thus axial position of the movable plate 90 is restrained.

Figure 9B:
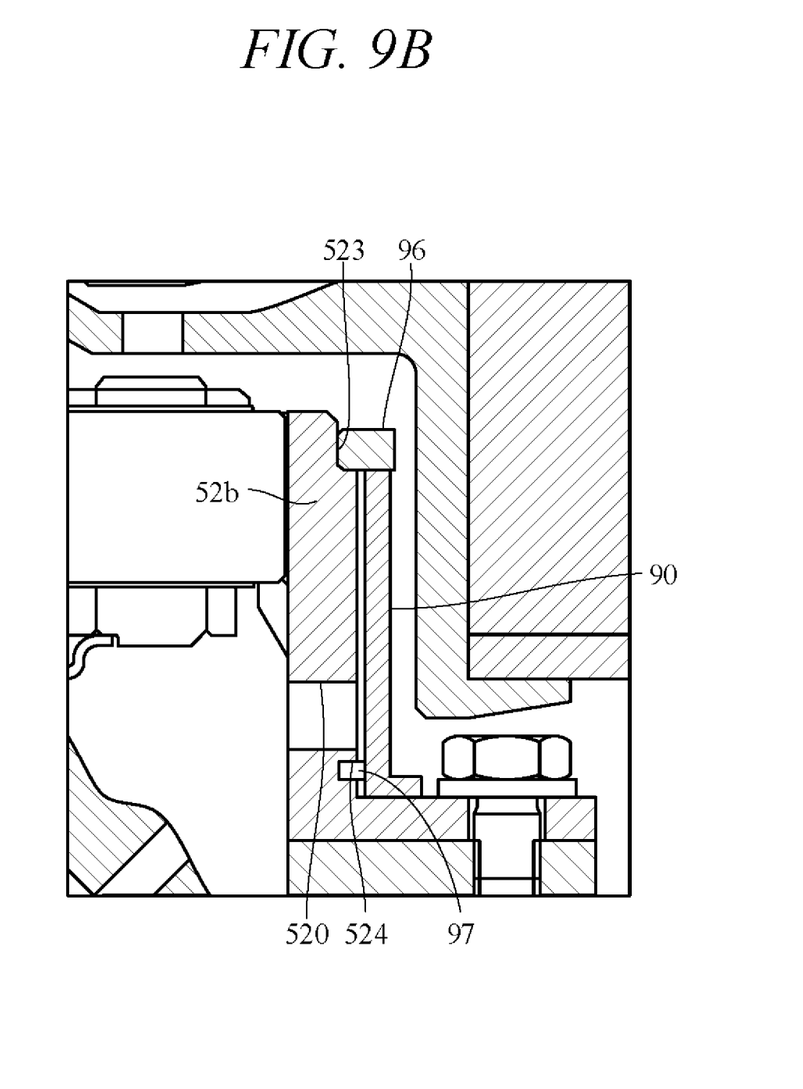
FIG. 9B is a diagram showing a second modification of FIG. 5.

FIG. 9B is a diagram showing another modification of the configuration in FIG. 5. FIG. 9B differs from FIG. 5 in mechanical seal structure. More specifically, in the modification shown in FIG. 9B, a groove 524 is formed over a whole circumference on the outer peripheral surface of the side wall 52*b* below the through-holes 520 and a mechanical seal 97 is fitted in the groove 524. This configuration ensures that the mechanical seal 97 is safe against detachment from the groove 524, and thus it enhances ease of assembly of the apparatus 100.

Figure 10A:
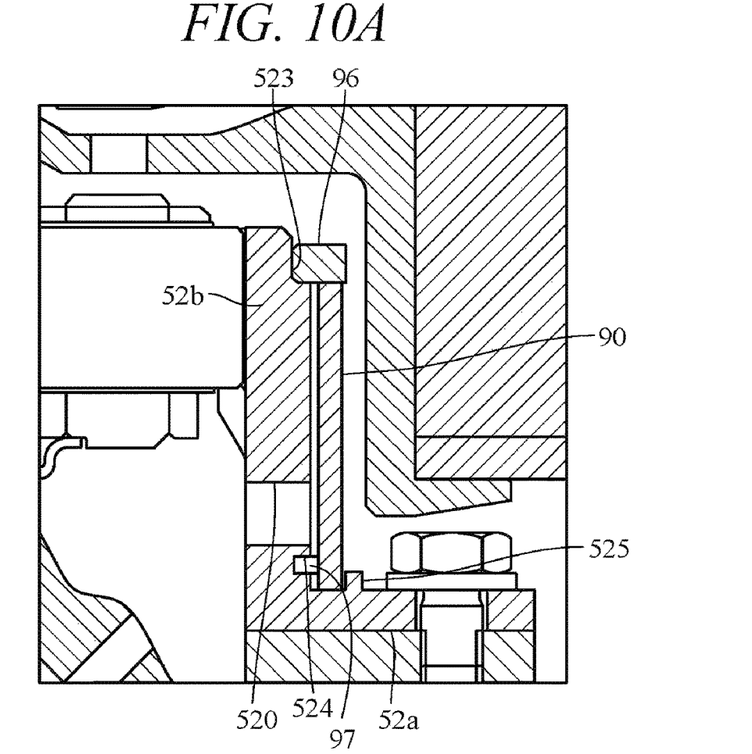
FIG. 10A is a diagram showing a third modification of FIG. 5.
Figure 10B:
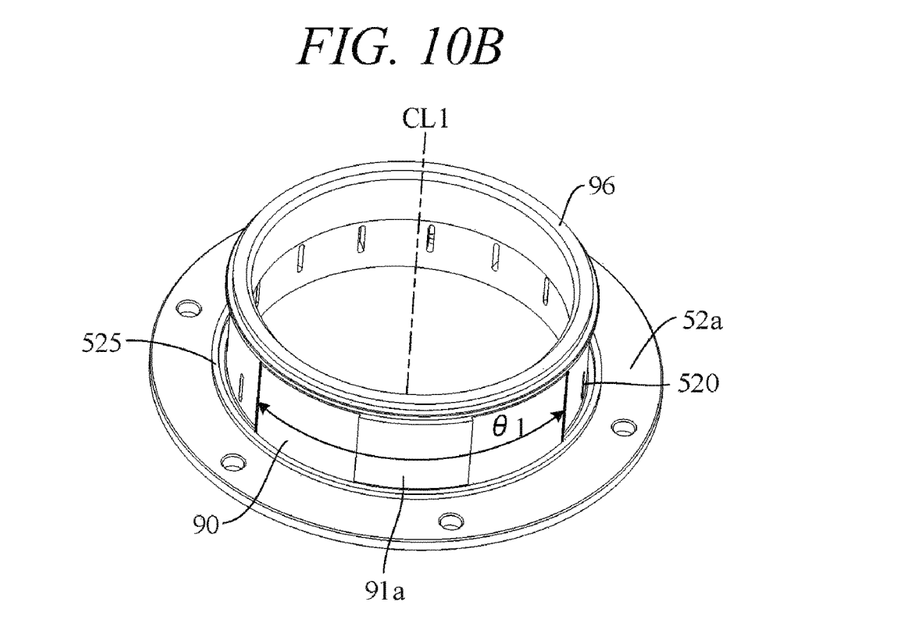
FIG. 10B is a perspective view showing main configuration of FIG. 10A.

FIG. 10A is a diagram showing still another modification of the configuration in FIG. 5, and FIG. 10B is a perspective view showing a main part of the modification. In the modification shown in FIGS. 10A and 10B, an axis CL1-centered ridge 525 is provided over a whole circumference on the upper surface of the flange 52*a* of the ring gear 52. The aforesaid flange 92 (FIG. 5) is removed from a lower end portion of the movable plate 90, and the so-modified lower end portion is placed radially inward of the ridge 525. This restrains position of the movable plate 90 in radial direction. Therefore, as shown in FIG. 10B, circumferential angle θ1 between opposite circumferential ends of the movable plate 90 can be defined smaller than 180°.

In the aforesaid embodiment, the reservoir space 70 is formed by the bottom wall 321 and cover 35 of the case 30 at the bottom of the vehicle drive apparatus 100 and the side wall 322 of the case 30, but a case member is not limited to this configuration. For example, a bottom wall portion can be constituted solely by the bottom wall of the case. Optionally, a side wall portion can be constituted by the pair of upper and lower side walls 312 and 322 instead of solely by the side wall 322. In the aforesaid embodiment, the movable plate 90 is installed to face the outer peripheral surface of the side wall 52*b* of the ring gear 52 of the planetary gear mechanism 50, but a partition can instead be configured using a member other than the side wall 52*b*. Alternatively, a movable plate can be installed to face an inner peripheral surface rather than an outer peripheral surface of the partition.

In the aforesaid embodiment, the reservoir space 70 is divided into the first reservoir space 71, second reservoir space 72 and third reservoir space 73 by means of the shaft support 34 and ring gear 52, but the number of reservoir space divisions is not limited to that stated in the foregoing and it suffices for the reservoir space 70 to be at least divided by a partition (e.g., the side wall 52*b* of the ring gear 52) into two spaces, i.e., into a radially inward space and a radially outward space of a partition. In other words, the radially inward space need not be divided into two spaces (a first reservoir space and a second reservoir space) but can be left undivided as a single reservoir space or be divided into three or more reservoir spaces. The radially outward space need not be made a single reservoir space (third reservoir space 73) but can instead be divided into multiple reservoir spaces. In the aforesaid embodiment, the protrusion 91*a* is formed at a circumferential center region of the arc plate 91 of the movable plate 90, but the movable plate is not limited to the aforesaid configuration and it is alternatively possible, for example, for the arc plate 91 to have uniform thickness in circumferential direction.

In the aforesaid embodiment, the second reservoir space 72 (part of a radially inward space) and the third reservoir space 73 (a radially outward space) are communicated by forming multiple circumferentially spaced through-holes in the side wall 52*b*, but openings are not limited to the those described above and the reservoir spaces can instead be communicated by forming multiple circumferentially spaced notches. In the aforesaid embodiment, the oil passage forming part 80 is constituted by the protrusion 323 of the bottom wall 321 of the case 30 and the side wall 322 of the case 30. In other words, the oil passages 74 and 76 are formed from the suction port 75 facing the first reservoir space 71 to the oil pump 82, but an oil passage forming part is not limited to the aforesaid configuration. In the aforesaid embodiment, the movable plate 90 is supported to be movable along the outer peripheral surface of the side wall 52*b* by means of, inter alia, the snap ring 95 and the mechanical seal 94, but a plate support can be of any configuration insofar as capable of supporting the movable plate to be movable along the circumferential surface of the side wall by gravitational or inertial force acting on the movable plate.

In the aforesaid embodiment, the first shaft 1 having the bevel gear 1*a* extends along the vertical axis CL1, but a rotating shaft is not limited to this configuration. In the aforesaid embodiment, torque of the motor MT is transmitted to the first shaft 1 through the planetary gear mechanism 50 in the aforesaid embodiment, but transmission of torque of the first shaft 1 through the planetary gear mechanism 50 to the motor MT is also possible. In the aforesaid embodiment, the gap between the ring gear 52 and movable plate 90 is sealed by the mechanical seal 94 or 97, but a seal member is not limited to the aforesaid configuration. In the aforesaid embodiment, the top surface of the movable plate 90 is supported by the snap ring 95 or nut 96, but an upper end support member is not limited to the aforesaid configuration.

The above embodiment can be combined as desired with one or more of the above modifications. The modifications can also be combined with one another.

According to the present invention, aeration in an oil pump can be prevented at the time of shifting of an oil level, without enlarging a vehicle drive apparatus in height direction.

Above, while the present invention has been described with reference to the preferred embodiments thereof, it will be understood, by those skilled in the art, that various changes and modifications may be made thereto without departing from the scope of the appended claims.

What is claimed is:

1. An aeration preventing apparatus, comprising:
   a case member installed in a vehicle and including a bottom wall portion and a side wall portion to form a reservoir space for accumulating an oil supplied from an oil pump;
   a partition erected on an upper surface of the bottom wall portion and formed in a substantially cylindrical shape about an axial line in a vertical direction to separate the reservoir space into a radially inward space and a radially outward space, the partition including openings formed over a whole circumference in the partition so as to communicate the radially inward space and the radially outward space;
   an oil passage forming part configured to form an oil passage from a suction port facing the radially inward space to the oil pump;
   a movable plate formed in a substantially arc shape about the axial line and disposed facing a peripheral surface of the partition so as to cover a part of the openings; and
   a plate support configured to support the movable plate to be movable along the peripheral surface of the partition by a gravitational or inertial force acting on the movable plate.

2. The aeration preventing apparatus according to claim 1, further comprising:
   a rotating shaft configured to rotate about the axial line above the bottom wall portion; and
   a planetary gear mechanism arranged around the rotating shaft so as to transmit a torque from or to the rotating shaft, wherein
   the partition is constituted by a ring gear of the planetary gear mechanism.

3. The aeration preventing apparatus according to claim 2, further comprising a dynamoelectric machine accommodated inside the case member, wherein
   the dynamoelectric machine includes a rotor rotating about the axial line and connected to the planetary gear mechanism so as to transmit a torque and a stator arranged around the rotor.

4. The aeration preventing apparatus according to claim 1, wherein
   the plate support includes a seal member to seal a gap between the side wall portion and the movable plate.

5. The aeration preventing apparatus according to claim 1, wherein
   the movable plate is formed so that a thickness thereof at a center region in a circumferential direction is thicker than a thickness thereof at both ends in the circumferential direction.

6. The aeration preventing apparatus according to claim 1, wherein
   the movable plate is arranged facing an outer peripheral surface of the partition, and
   the plate support includes a flange supporting a bottom surface of the movable plate and a projection projected from an upper surface of the flange along the outer peripheral surface of the movable plate to restrict a movement of the movable plate outward in a radial direction.

7. The aeration preventing apparatus according to claim 1, wherein
   the plate support includes an upper end support member attached to the partition to support an upper end surface of the movable plate.

* * * * *